United States Patent [19]

Hall

[11] Patent Number: 5,759,211

[45] Date of Patent: Jun. 2, 1998

[54] ANTHRAQUINONE DYES CONTAINING A FLUOROSULPHONYL GROUP AND USE THEREOF

[75] Inventor: Nigel Hall, Greenmount, United Kingdom

[73] Assignee: Zeneca Limited, London, England

[21] Appl. No.: 693,195

[22] PCT Filed: Jan. 23, 1995

[86] PCT No.: PCT/GB95/00097

§ 371 Date: Aug. 12, 1996

§ 102(e) Date: Aug. 12, 1996

[87] PCT Pub. No.: WO95/21958

PCT Pub. Date: Aug. 17, 1995

[30] Foreign Application Priority Data

Feb. 10, 1994 [GB] United Kingdom .................. 9402607

[51] Int. Cl.$^6$ .................. D06P 3/26; D06P 3/54; C09B 62/80; C09B 1/20
[52] U.S. Cl. .................. 8/306; 8/532; 8/533; 8/922; 552/242
[58] Field of Search .................. 8/506, 922, 529–533; 552/208–267

[56] References Cited

U.S. PATENT DOCUMENTS 2,576,037  11/1951  Parker et al. .
3,952,029  4/1976  Krutak, Sr. et al. .

FOREIGN PATENT DOCUMENTS 54-50681  4/1979  Japan .

*Primary Examiner*—Margaret Einsmann
*Attorney, Agent, or Firm*—Pillsbury Madison & Sutro LLP

[57] ABSTRACT

A process for colouring a synthetic textile material or fibre blend thereof which comprises applying to the synthetic textile material a compound of Formula (1):

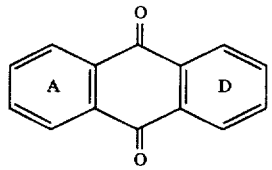

Formula (1)

wherein:

Ring A and Ring D are optionally substituted and at least one of Ring A or Ring D carries at least one —$SO_2F$ group except for 2-[(9,10-dihydro-9,10-dioxo-1-anthracenyl)amino] ethanesulphonylfluoride, 2-[(9,10-dihydro-9,10-dioxo-2-anthracenyl)amino] ethanesulphonylfluoride, 2,2'-[(9,10-dihydro-9,10-dioxo-1,4-anthracenediyl) diimino]bisethane sulphonylfluoride, 2,2'-[(9,10-dihydro-9,10-dioxo-1,5-anthracenediyl) diimino]bisethane sulphonylfluoride, 2,2'-[(9,10-dihydro-2-methoxy-9,10-dioxo-1,4-anthracenediyl)diimino) bisethanesulphonylfluoride, 2-[(4-(benzoylamino)-9,10-dihydro-9,10-dioxo-1-anthracenyl]amino]ethanesulphonylfluoride, 2-[(9,10-dihydro-4-(methylamino)-9,10-dioxo-1-anthracenyl]amino]ethane sulphonylfluoride.

4 Claims, No Drawings

ANTHRAQUINONE DYES CONTAINING A FLUOROSULPHONYL GROUP AND USE THEREOF

This application claims benefit of international application PCT/GB95/00097, filed Jan. 23, 1995, published as WO95/21958 Aug. 17, 1995.

The present invention relates to a process for colouring synthetic textile materials, to synthetic textiles when coloured, to a process for the mass coloration of plastics, to plastics when coloured to certain novel anthraquinone dyes and to compositions containing anthraquinone dyes.

According to the present invention there is provided a process for colouring a synthetic textile material or fibre blend thereof which comprises applying to the synthetic textile material a compound of Formula (1):

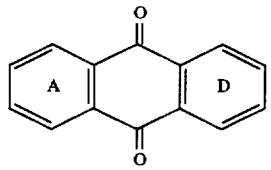

Formula (1)

wherein:
Ring A and Ring D are optionally substituted and at least one of Ring A or Ring D carries at least one —SO$_2$F group except for
- 2-[(9,10-dihydro-9,10-dioxo-1-anthracenyl)amino]ethanesulphonylfluoride,
- 2-[(9,10-dihydro-9,10-dioxo-2-anthracenyl)amino]ethanesulphonylfluoride,
- 2,2'-[(9,10-dihydro-9,10-dioxo-1,4-anthracenediyl)diimino]bisethane sulphonylfluoride,
- 2,2'-[(9,10-dihydro-9,10-dioxo-1,5-anthracenediyl)diimino]bisethane sulphonylfluoride,
- 2,2'-[(9,10-dihydro-2-methoxy-9,10-dioxo-1,4-anthracenediyl)diimino) bisethanesulphonylfluoride,
- 2-[(4-(benzoylamino)-9,10-dihydro-9,10-dioxo-1-anthracenyl]amino]ethanesulphonylfluoride,
- 2-[(9,10-dihydro-4-(methylamino)-9,10-dioxo-1-anthracenyl]amino]ethane sulphonylfluoride.

Different compounds of Formula (1) may be mixed or the compounds of Formula (1) may be mixed with dyes which do not contain an —SO$_2$F group, such mixtures are a feature of the present invention.

The mixtures may be simple physical mixtures or may be mixed crystals formed for example by co-crystallisation. Such mixtures generally show improvement in dyeing properties. Crystalline modifications of compounds of Formula (1) exist and it is intended that the present definition includes such crystalline modifications which may for example be formed by heat treatment.

According to a further feature of the present invention there is provided a process for colouring a polyester textile material or fibre blend thereof which comprises applying to the polyester textile material 2-[(9,10-dihydro-9,10-dioxo-1-anthracenyl)amino]ethanesulphonylfluoride,
- 2-[(9,10-dihydro-9,10-dioxo-2-anthracenyl)amino] ethanesulphonylfluoride,
- 2,2'-[(9,10-dihydro-9,10-dioxo-1,4-anthracenediyl)diimino] bisethane sulphonylfluoride,
- 2,2'-[(9,10-dihydro-9,10-dioxo-1,5-anthracenediyl)diimino] bisethane sulphonylfluoride,
- 2,2'-[(9,10-dihydro-2-methoxy-9,10-dioxo-1,4-anthracenediyl)diimino) bisethanesulphonylfluoride,
- 2-[(4-(benzoylamino)-9,10-dihydro-9,10-dioxo-1-anthracenyl]amino]ethanesulphonylfluoride,
- 2-[(9,10-dihydro-4-(methylamino)-9,10-dioxo-1-anthracenyl]amino]ethane sulphonylfluoride.

The presence of one or more —SO$_2$F groups in a dye molecule generally improves the properties of that dye and confers surprisingly good wet-fastness and light-fastness properties.

The synthetic textile material may be selected from secondary cellulose acetate, cellulose triacetate, polyamide, polyacrylonitrile and aromatic polyester. The synthetic textile material is preferably polyamide or aromatic polyester, such as polyhexamethylene adipamide or polyethylene terephthalate more preferably aromatic polyester and especially polyethlene terephthalate. Fibre blends may comprise mixtures of different synthetic textile materials or mixtures of synthetic and natural textile materials. Preferred fibre blends are those of polyester-cellulose such as polyester-cotton. The textile materials or blends thereof may be in the form of filaments, loose fibres, yarn, woven or knitted fibres.

The dyes of Formula (1) preferably have low solubility in water, typically less than 1% preferably less than 0.5% and especially less than 0.2% solubility in water. The dyes of Formula (1) are thus free from water solubilising groups such as —SO$_3$H, —CO$_2$H, —PO$_3$H and quaternary amino.

The dyes of Formula (1), optionally in conjunction with other disperse dyes may be applied to the synthetic textile materials or fibre blends thereof by methods which are conventionally employed in dyeing disperse dyes to such materials and fibre blends. For example, the dyes of Formula (1) in the form of an aqueous dispersion may be applied by dyeing, padding or printing processes using the conditions and additives conventionally used in carrying out such processes.

The process conditions may be selected from the following:

i) exhaust dyeing at a pH of from 4 to 6.5, at a temperature of from 125° C. to 140° C. for from 10 to 120 minutes and under a pressure of from 1 to 2 bar, a sequestrant may be optionally be added;

ii) continuous dyeing at a pH of from 4 to 6.5, at a temperature of from 190° C. to 225° C. for from 15 seconds to 5 minutes, a migration inhibitor may optionally be added;

iii) printing direct at a pH of from 4 to 6.5, at a temperature of from 160° C. to 185° C. for 4 to 15 minutes for high temperature steaming, or at a temperature of from 190° C. to 225° C. for 15 seconds to 5 minutes for bake fixation with dry heat or at a temperature of from 120° C. to 140° C. and 1 to 2 bar for 10 to 45 minutes for pressure steaming, wetting agents and thickeners (such as alginates) of from 5 to 100% by weight of the dye may be optionally be added;

iv) discharge printing (by padding the dye onto the textile material, drying and overprinting) at a pH of from 4 to 6.5, migration inhibitors and thickeners may optionally be added;

v) carrier dyeing at a pH of from 4 to 6.5, at a temperature of from 95° C. to 100° C. using a carrier such as methylnaphthalene, diphenylamine or 2-phenylphenol, sequesterants may optionally be added; and vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequesterants may optionally be added.

In all the above processes the compound of Formula (1) is applied as a dispersion comprising from 0.001% to 4% of the compound in aqueous medium.

The present compounds generally provide coloured textile material which shows good fastness to washing, light and heat.

Examples of suitable substituents for Rings A and D are cyano, hydroxy, nitro, halo such as fluoro, chloro or bromo, fluorosulphonyl, trifluoromethyl or alkyl, alkoxy, aryl, aryloxy, heterocycloalkyl, alkylthio, arylthio, heteroarylthio, —SO$_2$aryl,; —NHCOalkyl, —NHCOaryl, —NHSO$_2$alkyl, —NHSO$_2$aryl, —NHSO$_2$arylalkyl, —OCOalkyl, —OCOaryl, —COalkyl, —COaryl, —COOalkyl, —COOaryl, alkylOCOaryl, —SO$_2$alkyl, —SO$_2$aryl, —SO$_2$arylOH, —NR$^1$R$^2$ or —SO$_2$NR$^1$R$^2$ in which R$^1$ and R$^2$ each independently is —H, alkyl, aryl, alkylaryl, cycloalkyl and —COaryl or R$^1$ and R$^2$ together with the —N atom to which they are attached form a 5- or 6-membered ring such as morpholino or piperidino. Each of the alkyl, alkoxy, aryl, aryloxy, heterocycloalkyl, cycloalkyl parts of the substituents for Rings A and D may be optionally substituted by —OH, —CN, —Cl, —F, —Br, —SO$_2$F, alkyl, alkoxy, —OCOOalkyl, —SO$_2$NHalkylalkoxy, —OCOphenyl, -alkylN—CO(CH$_2$)$_4$ or -alkylN—CO(CH$_2$)$_5$ alkoxyethyl, hydroxyethyl or phenyl. Each alkyl in the above substituents is preferably C$_{1-10}$-alkyl more preferably C$_{1-6}$-alkyl, each alkoxy is preferably C$_{1-10}$-alkoxy more preferably C$_{1-6}$-alkoxy, each of which may be straight or branched chain alkyl or alkoxy, each aryl is preferably phenyl or naphthyl each aryloxy is preferably phenoxy or naphthoxy, each heterocycloalkyl is preferably triazolyl, each alkylthio is preferably C$_{1-6}$-alkylthio, each arylthio is preferably phenylthio, each heteroarylthio is preferably benzothiazolythio and each alkylaryl is preferably C$_{1-6}$-alkylphenyl especially benzyl, each —COaryl is preferably —COphenyl and each alkyl, alkoxy, aryl or cycloalkyl may carry an —SO$_2$F substituent, furthermore two adjacent substituents may be combined to form a 5-membered heterocyclic ring.

Preferred substituents for Rings A and D are hydroxy, chloro, bromo, fluorosulphonyl or aryloxy, heterocycloalkyl, heteroarylthio each of which is optionally substituted by —OH, —SO$_2$F, —OCOOalkyl, —SO$_2$NHalkylalkoxy, —OCOphenyl, -alkylN—CO (CH$_2$)$_5$, —NHSO$_2$aryl or —SO$_2$arylOH;

NR$^1$R$^2$ or —SO$_2$NR$^1$R$^2$ in which R$^1$ and R$^2$ each independently is —H, alkyl or aryl each of which is optionally substituted by —SO$_2$F, —OH, alkoxy or alkoxyalkyl.

Especially preferred substituents for Rings A and D are —OH, (4SO$_2$F)phenoxy, —NH$_2$, (4-OH-3-SO$_2$F)phenyl, —NH(4-SO$_2$Fphenyl), —NH(3-SO$_2$Fbenzyl, —NH(2,4-diSO$_2$Fphenyl), —SO$_2$phenyl, (4-SO$_2$F)phenylthio, —(CH$_2$)$_6$OCO(4-SO$_2$Fphenyl), —CO(4-SO$_2$Fphenyl), —NHphenyl and —NH(3-SO$_2$C$_2$H$_4$OSO$_3$Hphenyl)

The compounds of Formula (1) preferably carry a total of from 1 to 3-SO$_2$F groups, more preferably 1 or 2-SO$_2$F groups and especially 1-SO$_2$F groups.

The compounds of Formula (1) except for the compounds listed above and the following compounds 1-N-(4-methyl-3-fluorosulphonylphenyl)amino-4-N-methylaminoanthraquinone, 1-N-methylamino-4-N-benzylamino-2-fluorosulphonylanthraquinone, 1-amino-4-N-benzylamino-2-fluorosulphonylanthraquinone, 1-amino-5-fluorosulphonylanthraquinone, and 1-N((4-fluorosulphonyl)benzyl)amino-4-methylaminoanthraquinone are novel and accordingly form a further feature of the present invention.

A preferred sub-group of compounds of Formula (1) are those of Formula (2):

Formula (2)

in which:

R$^1$ and R$^2$ each independently is —H, or alkyl, alkylaryl, aryl or —COaryl optionally substituted by —SO$_2$F, —OH, alkoxy or alkylOH, or —SO$_2$aryl optionally substituted by —SO$_2$F, —SO$_2$alkylOSO$_3$H or alkyl;

R$^3$ is —H, —Cl, —Br, —SO$_2$F or alkyl, alkylOCOaryl, aryl, cycloalkyl, heterocycloalkyl, alkoxy, aryloxy, alkylthio, arylthio, heteroarylthio or —SO$_2$aryl each of which is optionally substituted by —OH, alkyl, alkoxy, —OCOOalkyl,

—CH$_2$N—CO(CH$_2$)$_5$,

—SO$_2$NHalkylalkoxy, —SO$_2$F, —COOalkyl or —OCOaryl;

R$^4$ is —H, —SO$_2$F, —Cl, —Br, —CN or aryl or aryloxy each optionally substituted by —OH, —SO$_2$F or —OCOOalkyl;

or R$^3$ and R$^4$ together with the carbon atoms to which they are attached form a 5-membered heterocyclic ring;

Z is —H, —OR$^1$, SR$^1$, —NR$^1$R$^2$ or —COaryl;

R$^5$ and R$^8$ each independently is —H, —NO$_2$, —OR$^1$, —NR$^1$R$^2$ or —SO$_2$F; and R$^6$ and R$^7$ each independently is —H, —SO$_2$F$_4$ or halo.

Where any of the groups represented by R$^1$, R$^2$, R$^3$, R$^5$ or R$^8$ is or contain alkyl or alkoxy substituents these are preferably C$_{1-10}$-alkyl or C$_{1-10}$-alkoxy, more preferably C$_{1-6}$-alkyl or C$_{1-6}$-alkoxy.

Where any of the groups represented by R$^1$, R$^2$, R$^3$, R$^4$, R$^5$ or R$^8$ is or contain aryl or aryloxy substituents these are preferably phenyl or phenoxy.

Where either of R$^1$ or R$^2$ is alkylaryl it is preferably C$_{1-6}$-alkylaryl, more preferably benzyl.

The heterocycloalkyl group represented by R$^3$ is preferably 1,2,4-triazin-5-yl.

The heteroarylthio group represented by R$^3$ is preferably benzothiazolylthio.

Where R$^6$ and R$^7$ are halo the halo is preferably —Cl, —Br or —I and more preferably —Cl.

Where R$^3$ and R$^4$ together with the carbon atoms to which they are attached form a 5-membered heterocyclic ring this is preferably of the Formula (3):

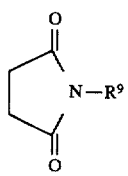
Formula (3)

in which $R^9$ is alkyl optionally substituted by $OR^1$ wherein $R^1$ is as hereinbefore defined.

$R^9$ is preferably $C_{1-6}$-alkyl.

Especially preferred compounds of Formula (2) are those in which $R^1$, $R^2$, $R^4$, $R^5$, $R^6$, $R^7$ and $R^8$ are all —H, Z is —OH and $R^3$ is (4-fluorosulphonyl)phenoxy and in which $R^1$, $R^2$, $R^5$ $R^6$, $R^7$ and $R^8$ are all —H, Z is —NH$_2$ and $R^3$ and $R^4$ are both 4-fluorosulphonyl phenoxy.

Compositions comprising dispersions of the compounds of Formula (1) in which Ring A and Ring D are as hereinbefore defined; and at least one of Rings A or D carries directly at least one —SO$_2$F group or carries a substituent to which at least one —SO$_2$F group is attached in aqueous media are novel and form a further feature of the present invention. The compositions typically comprise from 1% to 30% of the compound of Formula (1) and are preferably buffered at a pH from 2 to 7, more preferably at a pH from pH 4 to 6.

These dispersions may further comprise ingredients conventionally used in dyeing applications such as dispersing agents for example lignosulphonates, naphthalene sulphonic acid/formaldehyde condensates or phenol/cresol/sulphanilic acid/formaldehyde condensates, surfactants, wetting agents such as alkyl aryl ethoxylates which may be sulphonated or phosphated, inorganic salts, de-foamers such as mineral oil or nonanol, organic liquids and buffers. Dispersing agents may be present at from 10% to 200% on the weight of the compound of Formula (1). Wetting agents may be used at from 0% to 20% on the weight of the compound of Formula (1). The dispersions may be prepared by bead milling the compound of Formula (1) with glass beads or sand in an aqueous medium.

According to a further feature of the present invention there is provided a process for the mass coloration of plastics which comprises incorporating into a plastics material a compound or mixture thereof which is free from water solubilising groups, of Formula (1) wherein Ring A and Ring D are as hereinbefore defined and at least one of Rings A or D carries directly at least one —SO$_2$F group or carries a substituent to which at least one —SO$_2$F group is attached.

The plastics may be selected from polystyrene, acrylics, styrene/acrylonitrile mixtures, acrylonitrile/butadiene/styrene mixtures, polycarbonate, polyether-sulphone, nylons, rigid PVC (uPVC) and polypropylene.

The compound may be incorporated by blending with granules or powdered plastics material by, for example, dry tumbling or high-speed mixing followed by injection moulding on a screw machine or by conventional compounding/masterbatching techniques. The present dyes generally dissolve or disperse readily in hot plastics melt and provide bright coloration generally with good clarity and good light fastness.

The plastics materials when coloured with the above dyes form a further feature of the present invention.

The compounds of Formula (1) may be obtained by usual methods for the preparation of anthraquinone compounds such as by oxidation of anthracene or substituted anthracenes with potassium dichromate in sulphuric acid or by reaction of a phthalic anhydride with benzene or a substituted benzene in the presence of aluminium chloride followed by ring closure in hot sulphuric acid.

Fluorosulphonyl groups may be introduced into the compounds of Formulae (1) or (2) by methods generally available in the literature. For example reaction of a compound of Formulae (1) or (2) with chlorosulphonic acid optionally in the presence of dimethylformamide and thionylchloride at a temperature of from 30° C. to 100° C. gives the chlorosulphonyl derivative. The chlorosulphonyl derivative may be reacted in boiling aqueous media with potassium fluoride to give the fluorosulphonyl derivative.

Alternatively a compound of Formulae (1) or (2) may be sulphonated with sulphuric acid or oleum to give the sulphonic acid derivative which may be converted to the chlorosulphonyl derivative by reaction, either of the free acid or an inorganic salt thereof, with thionylchloride optionally in the presence of a chlorophosphorus compound such as phosphorus oxychloride or phosphorus pentachloride in an organic liquid such as an aromatic hydrocarbon at a temperature of from 20° C. to 110° C. The chlorosulphonyl derivative may then be converted to the fluorosulphonyl derivative as described above.

The compounds of Formulae (1) and (2) are useful for the coloration of synthetic textile materials particularly polyester textile materials and fibre blends thereof to which they impart colours which have excellent wet and light fastness properties.

The compounds of Formulae (1) and (2) are also useful for the mass coloration of plastics as described above and impart bright colours generally with good clarity and lightfastness.

The invention is further illustrated by the following Examples.

EXAMPLE 1

Preparation of 1-amino-4-hydroxy-2-(4-fluorosulphonylphenoxy)anthraquinone

To a mixture of 1-amino-4-hydroxy-2-(4-chlorosulphonylphenoxy)anthraquinone (2 parts) and 1,4-dioxane (25 parts), stirring at ambient temperature, was added a solution of potassium fluoride (0.6 parts) in water (5 parts). The mixture was heated to 60° C. and stirred at this temperature for 20 minutes. After cooling to 0°–5° C., the product was isolated by filtration, washed with water and dried at 50° C. to yield: 1-amino-4-hydroxy-2-(4-fluoro sulphonylphenoxy)anthraquinone (1.6 parts). λmax=515.0 nm (CH$_2$Cl$_2$).

EXAMPLE 2

Preparation of 1,5-dihydroxy-2-(4'-hydroxy-3'-fluorosulphonylphenyl-4,8-diaminoanthraquinone Chlorosulphonic acid (11.4 parts) was stirred at room temperature while 1,5-dihydroxy-2-(4'-hydroxyphenyl)-4,8-diaminoanthraquinone (0.5 parts) was added slowly over 30 mins. After stirring for 30 minutes thionyl chloride (2.5 parts) was added. The reaction mixture was stirred at 40° C. for 3 hours. On cooling the reaction mixture was poured into ice/water and the resulting aqueous suspension was filtered to yield the sulphonyl chloride derivative (0.49 parts).

The sulphonyl chloride derivative (1.6 parts) was added to 1,4-dioxane (94 parts) at room temperature before adding potassium fluoride (5.2 parts) in water (111 parts). After heating at 60° C. for 4 hours the mixture was cooled, filtered and dried to yield 1,5-dihydroxy-2-(4'hydroxy-3'-fluorosulphonylphenyl 4,8-diaminoanthraquinone (1.02 parts). λ max—587 nm, 629 nm.

Dyes of Formula (2) in which $R^6$ and $R^7$ are —H were prepared by the procedure of Example 2

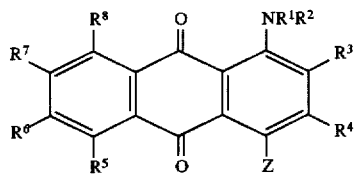

Formula (2)

and these are summarised in Table 1:

in 1,4-dioxan (468 parts)/water (555 parts). After cooling, the solvents were removed on a rotary evaporator to yield a solid which was washed with water before being dissolved in acetone and screened through silica. The acetone was removed to yield 1-amino-2-fluorosulphonyl-4-(N-(3-sulphonylethylsulphonic acid)phenyl aminoanthraquinone $\lambda_{max}$=512 nm.

| E.g. | $R^1$ | $R^2$ | $R^3$ | $R^4$ | Z | $R^5$ | $R^8$ | λmax nm |
|---|---|---|---|---|---|---|---|---|
| 3 | 4-SO₂Fphenyl | H | H | H | —OH | H | H | 514.7 |
| 4 | 4-SO₂Fphenyl | H | H | H | —NH(4-SO₂Fphenyl) | H | H | 401, 570 |
| 5 | H | H | 4-SO₂Fphenyl | 4- | —NH₂ | H | H | 564.1, 582.7 |
| 6 | 4-SO₂Fphenyl | H | H | SO₂Fphenoxy | —OH | H | H | — |
| 7 | 3-SO₂Fbenzyl | H | H | H | —H | H | H | — |
| 8 | 2,4-DiSO₂Fphenyl | H | H | H | —NH(4-SO₂Fphenyl) | H | H | 542 |
| 9 | | H | —SO₂phenyl | H | —NH₂ | H | H | 36, 590 |
| 10 | 4-SO₂Fphenyl | H | H | H | —H | H | H | |
| 11 | H | H | H | H | 4-SO₂Fphenylthio | H | H | |
| 12 | H | H | SO₂Fphenylthio | H | 4-SO₂Fphenylthio | H | H | |
| 13 | H | H | H | H | | H | H | |
| 14 | H | H | —(CH₂)₆OCO(4-SO₂Fphenyl) | H | —OH | H | H | |
| 15 | H | H | —(CH₂)₆OCO(4-SO₂Fphenyl) | H | —CO(4-SO₂Fphenyl) | H | H | |
| 16 | —CO(4-SO₂Fphenyl) | H | —(CH₂)₆OCO(4-SO₂Fphenyl) | H | —OH | H | H | 449 |
| 17 | 2,4-DiSO₂Fphenyl | H | H | H | —NH₂ | H | H | 372, 451 |

For examples of dyes made see Table 1.

EXAMPLE 18

Preparation of 1-amino-2-fluorosulphonyl-4-(N-phenyl)aminoanthraquinone

1-Amino-(N-phenyl)aminoanthraquinone-2-sulphonic acid (2.5 parts) was heated in pyridine (100 parts) at reflux for 2 hours. The reaction mixture was filtered and the pyridine removed on a rotary evaporator to yield 2.3 parts of the pyridinium salt.

The pyridinium salt (1 part) was heated at 75° C. for 45 minutes in POCl₃. (20 parts). On cooling, the reaction mixture was poured into ice/water, filtered and the resulting solid was washed several times with water. The sulphonyl chloride was heated at 100° C. for 3 hours with potassium fluoride (3 parts) in 1,4-dioxan (47 parts)/water (22 parts). After cooling the reaction mixture was filtered and the solid obtained washed with water to yield 1-amino-2-fluorosulphonyl-4-(N-phenyl)aminoanthraquinone (0.2 parts).

EXAMPLE 19

Preparation of 1-amino-2-fluorosulphonyl-4-(N-(3-sulphonylethylsulphonic acid)phenyl Aminoanthraquinone 1-Amino-4-(N-(3-sulphonylethylsulphonic acid)phenyl) aminoanthraquinone-2-sulphonic acid (1.2 parts) was heated to reflux in pyridine (814 parts) for 24 hours. The pyridine was removed by rotary evaporator and the resulting solid washed with petroleum ether (b. pt. 60°–80° C.) to give the dipyridinium salt which was dissolved in DMF (972 parts) and thionyl chloride (340 parts) was added dropwise. The mixture was heated at 80° C. for 4–5 hours, cooled, poured into water and filtered to give the sulphonyl chloride derivative.

The sulphonyl chloride derivative (1.76 parts) was heated at 80° C. for 18 hours with potassium fluoride (13.5 parts)

EXAMPLE 20 AND 21

Preparation of 1-amino-2-fluorosulphonyl-4-(N-(4-fluorosulphonyl)phenyl)aminoanthraquinone and 1-amino-2-fluorosulphonyl-4-(N-(2,4-difluorosulphonyl)phenyl)aminoanthraquinone 1-Amino-2-chlorosulphonyl-4-(N-phenyl) aminoanthraquinone (1 part) was added to a stirred mixture of chlorosulphonic acid (35 parts) and thionyl chloride (8 parts), and heated at 65° C. for 2.5 hours. After cooling to room temperature the reaction mixture was poured into ice/water and filtered to yield a solid which was washed several times with water. The solid was heated at 100° C. for 2 hours with potassium fluoride (40 parts) in 1,4-dioxan (480 parts)/water (440 parts). On cooling, the reaction mixture was filtered and the solid obtained washed with water to give 1-amino-2-fluorosulphonyl-4-(N-(4-fluorosulphonyl)phenyl)aminoanthraquinone and 1-amino-2-fluorosulphonyl-4-(N-(2,4-difluorosulphonyl)phenyl) aminoanthraquinone $\lambda_{max}$=534 nm. The compounds may be separated chromatographically.

EXAMPLE 22 AND 23

Preparation of 1,5-dihydroxy-2,6-difluorosulphonyl-4,8-diaminoanthraquinone and 1,5-dihydroxy-2-fluorosulphonyl-4,8-diamino-6-chloroanthraquinone.

1,5-Diamino-3,7-disulphoanthrarufin (2.7 parts) was heated in pyridine (10 parts) at reflux for 2 hours. The solution was then filtered and the pyridine removed on a rotary evaporator to yield the dipyridinium salt (2.5 parts).

The pyridinium salt (0.47 parts) was heated at 75° C. for 9 hours in POCl₃ (107 parts). After adding toluene (235 parts) the reaction mixture was heated at 120° C. for 3 hours. After cooling, the reaction mixture was filtered and the resulting solid sulphonyl chloride was washed several times with water. The sulphonyl chloride was heated at 100° C. for 3 hours with potassium fluoride (1.7 parts) in 1,4-dioxan (59 parts). After cooling, the reaction mixture was filtered and the solid obtained washed with water to give 1,5-dihydroxy-2,6-difluorosulphonyl-4,8-diaminoanthraquinone and 1,5-dihydroxy-2-fluorosulphonyl-4,8-diamino-6-chloroanthraquinone. The product was a mixture of 22 and 23, with 23 being the major component of the mixture.

EXAMPLE 24

Preparation of 1-amino-4-(N-(4-fluorosulphonyl)phenyl)aminoanthraquinone

1-Amino-4-bromoanthraquinone (3.3 parts), sodium acetate (5 parts), cupric acetate (0.5 parts) and sulphanilyl fluoride (4 parts) were stirred in o-dichlorobenzene (88 parts) at 190° C. for 30 hours. The solution was allowed to cool and filtered, the solid was washed with water several times to give 1-amino-4-(N-(4-fluorosulphonyl)phenyl)aminoanthraquinone.

EXAMPLE 25

Preparation of 1-amino-4-hydroxy-2-(4-fluorosulphonylphenoxy)anthraquinone

A mixutre of 1-amino-4-hydroxy-2-phenoxyanthraquinone (0.2 g) was stirred overnight with fluorosulphonic acid (10 cm³) and poured onto ice. The precipitated solid was collected by filtration and washed with water and dried to give 1-amino-4-hydroxy-2-phenoxy anthraquinone (0.17 g, 70%).

I claim:
1. A compound of Formula (2):

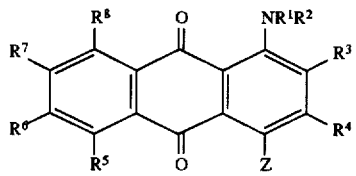

Formula (2)

in which:

$R^1$ & $R^2$ is H $R^3$ is H or 4-fluorosulphonylphenoxy $R^4$ is H or 4-fluorosulphonylphenoxy $R^5$ & $R^8$ are H, OH or $NH_2$;

Z is OH or $NH_2$;

$R^6$ & $R^7$ are H.

2. A compound of Formula (2):

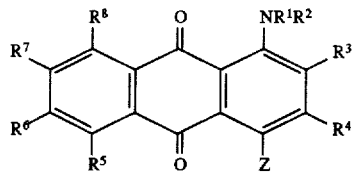

Formula (2)

in which:

$NR^1R^2$ is $NH_2$;

$R^3$ is 4-fluorosulphonylphenoxy $R^4$ & $R^5$ is H

Z is OH;

$R^6$, $R^7$ & $R^8$ are H.

3. A process for colouring an aromatic polyester or fibre blend thereof which comprises applying to the aromatic polyester a compound according to claim 1 or claim 2.

4. A process for the mass coloration of plastics which comprises incorporating into a plastics material a compound according to claim 1 or claim 2.

* * * * *